(12) United States Patent
Hibino

(10) Patent No.: US 10,570,981 B2
(45) Date of Patent: Feb. 25, 2020

(54) SUPPORT FOOT FOR ELECTRONIC DEVICE AND ELECTRONIC DEVICE

(71) Applicant: YAMAHA CORPORATION, Hamamatsu-shi (JP)

(72) Inventor: Akira Hibino, Iwata (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/912,617

(22) Filed: Mar. 6, 2018

(65) Prior Publication Data

US 2018/0259025 A1 Sep. 13, 2018

(30) Foreign Application Priority Data

Mar. 7, 2017 (JP) .................................. 2017-043312

(51) Int. Cl.
*H04R 1/02* (2006.01)
*F16F 7/00* (2006.01)
*F16F 7/12* (2006.01)

(52) U.S. Cl.
CPC .............. *F16F 7/121* (2013.01); *F16F 7/003* (2013.01); *F16F 2228/04* (2013.01); *F16F 2234/02* (2013.01); *H04R 1/026* (2013.01)

(58) Field of Classification Search
CPC .................. F16F 7/12; F16F 7/00; H04R 1/02
USPC ......................................... 381/333, 334, 388
See application file for complete search history.

(56) References Cited

U.S. PATENT DOCUMENTS

| 4,249,037 | A | * | 2/1981 | Dexter | ..................... H04R 1/02 181/144 |
| 5,599,043 | A | * | 2/1997 | Fujita | ..................... B60R 21/045 280/732 |
| 6,639,158 | B2 | | 10/2003 | Germanton | |

FOREIGN PATENT DOCUMENTS

| JP | H08032246 A | 2/1996 |
| JP | H08079872 A | 3/1996 |

OTHER PUBLICATIONS

Office Action issued in Japanese Appln. No. 2017-043312 dated Jan. 29, 2019. English translation provided.
Office Action issued in Chinese Application No. 201810187964.X dated Oct. 9, 2019. English translation provided.

* cited by examiner

*Primary Examiner* — Suhan Ni
(74) *Attorney, Agent, or Firm* — Rossi, Kimms & McDowell LLP

(57) ABSTRACT

An object of the present invention is to provide a support foot for an electronic device having superior anti-vibration properties. A support foot for an electronic device according to an aspect of the present invention comprises: an attachment portion to be fixed to an electronic device main body; an outer peripheral wall portion cylindrically shaped and provided on an outer periphery of the attachment portion; and a rib structure provided between the attachment portion and the outer peripheral wall portion, wherein the rib structure comprises an oblique rib that is, in a planar view, oblique with respect to a radial direction in relation to a central axis of the outer peripheral wall portion.

11 Claims, 10 Drawing Sheets

SUPPORT FOOT FOR ELECTRONIC DEVICE AND ELECTRONIC DEVICE

BACKGROUND OF THE INVENTION

The present invention relates to a support foot for an electronic device, and an electronic device.

DESCRIPTION OF THE RELATED ART

Many of electronic devices such as audio devices and analysis/measurement devices are each provided with a support foot, which is capable of absorbing vibration, attached to a bottom face for an anti-vibration effect. Such a support foot comprises: a flat cylindrical outer shell which is smaller in an axial direction than in a lateral direction, with a bottom plate; and plate-like ribs that are parallel to the axial direction and provided on the bottom plate of the outer shell, in which an upper edge of the ribs in a central part in a planar view protrudes to a higher level than an upper edge of the outer shell. The support foot is attached to an electronic device main body in such a manner that the upper edge of the ribs in the central part is in contact with a bottom face of the electronic device main body.

In order to further improve the anti-vibration effect of such a support foot, Japanese Unexamined Patent Application, Publication No. H8-32246 discloses changing, according to an angular position, a resonance frequency between the protruding part of the rib and the outer shell by offsetting from a center of the outer shell, a center of the protruding part of the ribs, which is to be in contact with the bottom face of the electronic device main body.

The constitution disclosed in the above cited publication is capable of inhibiting resonance, but not capable of improving anti-vibration properties over an entire frequency range.

PRIOR ART DOCUMENTS

Patent Documents

Patent Document 1: Japanese Unexamined Patent Application, Publication No. H8-32246

SUMMARY OF THE INVENTION

Problems to be Solved by the Invention

In view of the aforementioned circumstances, an object of the present invention is to provide a support foot for an electronic device (hereinafter, may be merely referred to as "support foot") having superior anti-vibration properties, and an electronic device.

Means for Solving the Problems

A support foot for an electronic device according to an aspect of the present invention made for solving the aforementioned problems comprises: an attachment portion to be fixed to an electronic device main body; an outer peripheral wall portion cylindrically shaped and provided on an outer periphery of the attachment portion; and a rib structure provided between the attachment portion and the outer peripheral wall portion, wherein the rib structure comprises an oblique rib that is, in a planar view, oblique with respect to a radial direction in relation to a central axis of the outer peripheral wall portion.

An electronic device according to another aspect of the present invention comprises: an electronic device main body; and the above-described support foot attached to a bottom face of the electronic device main body.

DESCRIPTION OF EMBODIMENTS

Embodiments of the present invention will be described in detail hereinafter, with appropriate reference to the drawings.

A support foot for an electronic device according to an aspect of the present invention made for solving the aforementioned problems comprises: an attachment portion to be fixed to an electronic device main body; an outer peripheral wall portion cylindrically shaped and provided on an outer periphery of the attachment portion; and a rib structure provided between the attachment portion and the outer peripheral wall portion, wherein the rib structure comprises an oblique rib that is, in a planar view, oblique with respect to a radial direction in relation to a central axis of the outer peripheral wall portion.

It is preferred that at least a part of the oblique rib is curved.

It is preferred that the rib structure further comprises a straight rib that extends in the radial direction in relation to the central axis of the outer peripheral wall portion.

It is preferred that the straight rib is provided in a circular region around the central axis of the outer peripheral wall portion and the oblique rib is provided in an annular region on an outer periphery of the circular region.

It is preferred that the rib structure comprises a connecting rib that is provided such that the straight rib or the oblique rib is connected to the outer peripheral wall portion, and is smaller in thickness than the straight rib and the oblique rib.

It is preferred that the rib structure further comprises an intermediate rib annularly shaped and provided between the straight rib and the oblique rib.

The support foot according to the aspect of the present invention comprises a straight rib that extends in the radial direction in a planar view, and the oblique rib that is oblique with respect to the radial direction, the straight rib enabling strength to be ensured and the oblique rib enabling the vibration to be attenuated. As a result, the support foot has superior anti-vibration properties.

An electronic device according to another aspect of the present invention comprises: an electronic device main body; and the above-described support foot attached to a bottom face of the electronic device main body.

Electronic Device

Figure 1:
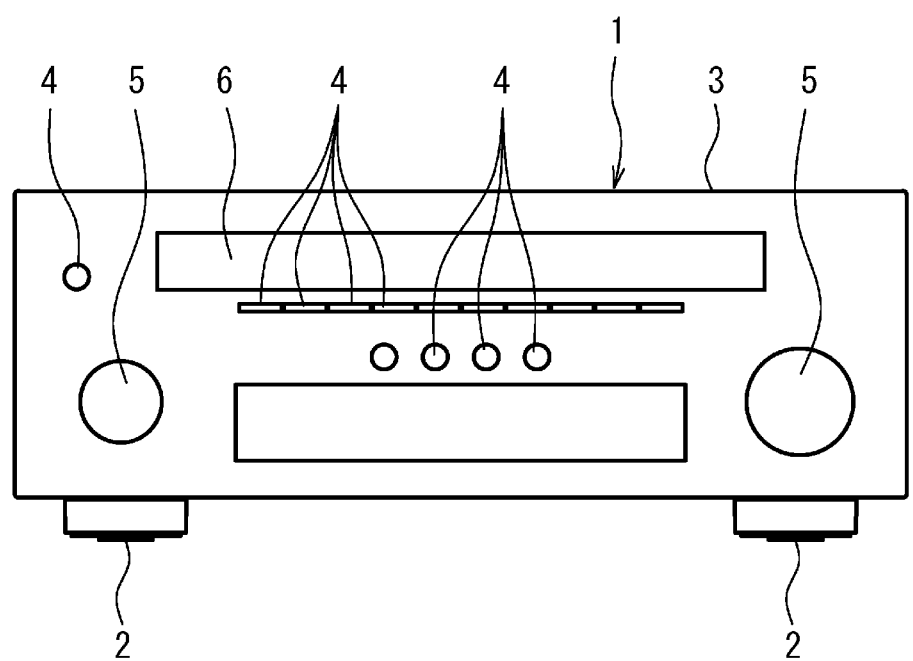
FIG. 1 is a schematic front view of an electronic device according to one embodiment of the present invention.

FIG. 1 shows an electronic device according to one embodiment of the present invention. The electronic device shown in FIG. 1 is an AV amplifier (audio/visual amplifier). The AV amplifier processes an input audio signal and an input video signal for, for example, eliminating noises, amplifying the signals, etc., and then outputs the processed signals to output units such as a speaker and a display unit.

The electronic device comprises: an electronic device main body 1; and a plurality of support feet 2, each being another embodiment of the present invention, attached to a bottom face of the electronic device main body 1. More specifically, four support feet 2 are attached to the bottom face of the electronic device main body 1.

Electronic Device Main Body

The electronic device main body 1 comprises a box-shaped housing 3, in which an electronic circuit and the like are provided. Furthermore, on a front face of the housing 3 of the electronic device main body 1, various types of operating members such as a push button switch 4 and a rotating knob 5, as well as a display unit 6 constituted of, for example, an LED, an LCD panel, and the like, are provided.

In the case of supporting the electronic device main body 1 with the four support feet 2, the mass of the electronic device main body 1 may be 8 kg or more and 20 kg or less.

Support Foot

As shown in FIGS. 2 to 5, the support foot 2 is formed such that an exterior shape thereof is a flat columnar shape, in other words, a columnar shape of which axial length is smaller than the diameter. A ratio of the maximum axial length to the average diameter of the support foot 2 may be, for example, 0.2 or more and 0.4 or less.

The support foot 2 includes a bottomed cylindrical outer shell 7, and a rib structure 8 provided in the outer shell 7. The outer shell 7 and the rib structure 8 are integrally formed from a resin. The support foot 2 further includes a cushion sheet 9 pasted onto the bottom face of the outer shell 7.

Outer Shell

The outer shell 7 includes a circular cylindrical outer peripheral wall portion 10 and a bottom wall portion 11. The bottom wall portion 11 has smaller thickness in and around an external marginal region, and a region other than this region protrudes downwards. At a center of the bottom wall portion 11, a securing hole 12 is provided, into which a screw for securing the support foot 2 to the electronic device main body 1 is to be inserted. On a bottom face of the bottom wall portion 11, a positioning groove 13 is provided that indicates a pasting position of the cushion sheet 9. In addition, at one position in the marginal region of the bottom wall portion 11, an indicator projection 14 is provided that indicates an orientation of the support foot 2 with respect to a central axis (orientation of the rib structure 8).

The outer shell 7 and the rib structure 8 (described below) may be formed integrally by injection molding. Therefore, the outer peripheral wall portion 10 of the outer shell 7, and the rib structure 8 may have a draft angle for release from a mold.

Examples of the resin for forming the outer shell 7 and the rib structure 8 include: polyolefins such as polyethylene and polypropylene; polyesters such as polyethylene terephthalate and polybutylene terephthalate; ABS resins (acrylonitrile butadiene styrene copolymers); and the like.

Outer Peripheral Wall Portion

The outer peripheral wall portion 10 of the outer shell 7 ensures a good appearance, and holds the outer periphery of the rib structure 8 to suppress vibration.

An average thickness of the outer peripheral wall portion 10 depends on its material, but the lower limit thereof is preferably 1.2 mm and more preferably 1.5 mm. Meanwhile, the upper limit of the average thickness of the outer peripheral wall portion 10 is preferably 2.5 mm and more preferably 2.0 mm. When the average thickness of the outer peripheral wall portion 10 is less than the lower limit, strength of the outer peripheral wall portion 10 may be insufficient. To the contrary, when the average thickness of the outer peripheral wall portion 10 is more than the upper limit, the outer peripheral wall portion 10 may be too rigid and consequently a connection portion with the rib structure 8 may be more likely to be broken by vibration.

Bottom Wall Portion

The bottom wall portion 11 of the outer shell 7 serves as a base for the rib structure 8. Since vibration is suppressed due to the lower end of the rib structure 8 being connected to the bottom wall portion 11, strain is generated in an inner part during propagation of vibration, leading to attenuation of the vibration by converting vibration energy into heat.

The lower limit of an average thickness of the bottom wall portion 11 is preferably 2 mm and more preferably 3 mm. Meanwhile, the upper limit of the average thickness of the bottom wall portion 11 is preferably 10 mm and more preferably 8 mm. When the average thickness of the bottom wall portion 11 is less than the lower limit, strength of the bottom wall portion 11 may be insufficient. On the other hand, when the average thickness of the bottom wall portion 11 is more than the upper limit, the height of the support foot 2 may be unnecessarily large.

Rib Structure

The rib structure 8 is provided inside the outer shell 7, in parallel with the axial direction. In other words, the rib structure 8 is constituted from a plurality of ribs which protrude from the bottom wall portion 11 in the axial direction of the support foot 2. The plurality of ribs in the rib structure 8 are each formed in a strip-like plate shape that extends along the bottom wall portion 11, with one side edge (lower edge) being connected to the bottom wall portion 11.

In the rib structure 8, a central part has a slightly greater height in a planar view, thereby protruding upwards to abut the bottom face of the electronic device main body 1. Therefore, the central part principally serves as an attachment portion 15 that supports the weight of the electronic device main body 1. Meanwhile, a part on the outer side of the attachment portion 15 in the rib structure 8 serves as a vibration suppression portion 16 that does not abut the bottom face of the electronic device main body 1 and principally absorbs vibration. In other words, the rib structure 8 includes a first rib structure that constitutes the attachment portion 15, and a second rib structure that constitutes the vibration suppression portion 16 provided between the attachment portion 15 and the outer peripheral wall portion 10.

The attachment portion 15 of the rib structure 8 includes: a circular cylindrical central rib 17 that is formed to be continued from an inner edge of the securing hole 12 on the bottom wall portion 11 and receives a screw for securing the support foot 2 to the electronic device main body 1; an annular boundary rib 18 that defines an outer edge of the attachment portion 15; and a plurality of inner straight ribs 19 that are formed radially with respect to the central axis of the support foot 2 such that the central rib 17 is connected to the boundary rib 18. A bearing plate 20 is formed on an inner side of the upper edge of the central rib 17 and serves as a bearing surface for the screw for securing the support foot 2 to the electronic device main body 1.

In the attachment portion 15, the inner straight ribs 19 are formed to firmly connect the central rib 17 to the boundary rib 18, such that the central rib 17, the boundary rib 18, and the inner straight ribs 19 can be collectively considered substantially as a rigid body. Thus, the attachment portion 15 is enabled to have sufficient strength to be capable of principally supporting the weight of the electronic device main body 1.

The vibration suppression portion 16 of the rib structure 8 includes: a plurality of outer straight ribs 21 that are formed to extend from the boundary rib 18 of the attachment portion 15, radially with respect to the central axis of the support foot 2; a plurality of oblique ribs 22 provided on an outer side of the respective outer straight ribs 21 to be oblique with respect to the radial direction and to extend outwards; and a plurality of connecting ribs 23 that connect respective outer ends of the oblique ribs 22 to the outer peripheral wall portion 10 of the outer shell 7. The vibration suppression portion 16 of the rib structure 8 further includes an annular intermediate rib 24 provided between the outer straight ribs 21 and the oblique ribs 22.

Outer Straight Rib

The plurality of outer straight ribs 21 are provided in the circular region around the central axis of the support foot 2. In other words, distances between respective ends of the outer straight ribs 21 and the central axis of the support foot 2 are equal.

One of the outer straight ribs 21 is provided with a positioning projection 25 formed to protrude upwards to fit with an engagement hole formed on the bottom face of the electronic device main body 1. The positioning projection 25 defines an orientation of the support foot 2 with respect to the central axis. The indicator projection 14 enables determination of the position of the positioning projection 25 from the bottom face side of the support foot 2.

The outer straight ribs 21 restrict a propagation direction of vibration between the attachment portion 15 and the oblique ribs 22, to the radial direction in relation to the central axis of the support foot 2.

An average thickness of the outer straight rib 21 depends on a material, but the lower limit thereof is preferably 2 mm and more preferably 2.5 mm. Meanwhile, the upper limit of the average thickness of the outer straight rib 21 is preferably 3.5 mm and more preferably 3.0 mm. When the average thickness of the outer straight rib 21 is less than the lower limit, strength of the outer straight rib 21 may be insufficient. To the contrary, when the average thickness of the outer straight rib 21 is more than the upper limit, the restriction of the propagation direction of vibration may be insufficient.

The lower limit of an average length of the outer straight rib 21 in the radial direction is preferably 2.0 mm and more preferably 2.5 mm. Meanwhile, the upper limit of the average length of the outer straight rib 21 is preferably 4.0 mm and more preferably 3.5 mm. When the average length of the outer straight rib 21 is less than the lower limit, the restriction of the propagation direction of vibration to the radial direction may be insufficient. To the contrary, when the average length of the outer straight rib 21 is more than the upper limit, the size of the support foot 2 may be unnecessarily large.

Oblique Rib

The plurality of oblique ribs 22 are oblique with respect to the radial direction in relation to the central axis of the support foot 2, and thus are deformed to be bent toward the respective outer straight ribs 21. Therefore, the oblique ribs 22 convert the vibration energy into heat to efficiently attenuate vibration which propagates in the radial direction. Accordingly, the support foot 2 is able to attenuate the vibration of the electronic device main body 1 and to suppress vibration propagated from a mounting surface of the installation site to the electronic device main body 1.

In addition, the plurality of oblique ribs 22 are provided in an annular region on an outer periphery of the circular region in which the outer straight ribs 21 are arranged. Therefore, ensuring the strength of the support foot 2 and efficiently attenuating the vibration propagated between the outer peripheral wall portion 10 and the attachment portion 15 are enabled.

The lower limit of an average inclination angle of the oblique rib 22 with respect to the radial direction is preferably 15° and more preferably 20°. Meanwhile, the upper limit of the average inclination angle of the oblique rib 22 with respect to the radial direction is preferably 45° and more preferably 40°. When the average inclination angle of the oblique rib 22 with respect to the radial direction is less than the lower limit, the oblique rib 22 may be less likely to deform, and therefore sufficient absorption of the vibration may fail. To the contrary, when the average inclination angle of the oblique rib 22 with respect to the radial direction is more than the upper limit, the oblique rib 22 have greater elastic deformability, and consequently sufficient absorption of the vibration may fail, due to a decreased efficiency of conversion of the vibration energy into heat.

The oblique rib 22 may be formed to be straight in a planar view, but it is preferred that at least a part thereof is curved. Due to being curved, the oblique rib 22 is more likely to be bent at the curved portion and thus an improvement of the ability to attenuate the vibration through converting the vibration energy into heat is enabled.

The lower limit of the minimum curvature radius of the oblique rib 22 at a center in the thickness direction is preferably 10 mm, and more preferably 15 mm. Meanwhile, the upper limit of the minimum curvature radius of the oblique rib 22 at the center in the thickness direction is preferably 40 mm, and more preferably 30 mm. When the minimum curvature radius of the oblique rib 22 at the center in the thickness direction is less than the lower limit, the oblique rib 22 may be too easily bendable and consequently the vibration energy to be converted into thermal energy may be lower. To the contrary, when the minimum curvature radius of the oblique rib 22 at the center in the thickness direction is more than the upper limit, deformability of the oblique rib 22 may not be sufficiently improved.

An average thickness of the oblique rib 22 depends on a material, but the lower limit thereof is preferably 2 mm and more preferably 2.5 mm. Meanwhile, the upper limit of the average thickness of the oblique rib 22 is preferably 3.5 mm and more preferably 3.0 mm. When the average thickness of the oblique rib 22 is less than the lower limit, deformability of the oblique rib 22 may be excessive, and consequently absorbable vibration energy may be lower. To the contrary, when the average thickness of the oblique rib 22 is more than the upper limit, the oblique rib 22 may be too rigid and thus sufficient absorption of the vibration may fail.

The lower limit of an average length of the oblique rib 22 is preferably 3 mm and more preferably 5 mm. Meanwhile, the upper limit of the average length of the oblique rib 22 is preferably 10 mm and more preferably 8 mm. When the average length of the oblique rib 22 is less than the lower limit, the oblique rib 22 may not have sufficient deformability, and therefore sufficient attenuation of the vibration may fail. To the contrary, when the average length of the oblique rib 22 is more than the upper limit, the size of the support foot 2 may be unnecessarily large.

Connecting Rib

The plurality of connecting ribs 23 are provided such that the respective oblique ribs 22 are connected to the outer peripheral wall portion 10 of the outer shell. The connecting rib 23 is smaller in thickness than the outer straight rib 21 and the oblique rib 22. As a result, further suppression of the vibration is enabled that is propagated to the outer peripheral wall portion 10 through the outer straight ribs 21 and the oblique ribs 22.

The lower limit of an average thickness of the connecting rib 23 is preferably 0.8 mm and more preferably 1.0 mm. Meanwhile, the upper limit of the average thickness of the connecting rib 23 is preferably 2.0 mm and more preferably 1.5 mm. When the average thickness of the connecting rib 23 is less than the lower limit, strength of the connecting rib 23 may be insufficient. To the contrary, when the average thickness of the connecting rib 23 is more than the upper limit, the vibration absorption ability of the support foot 2 may not be sufficiently improved.

The lower limit of an average length of the connecting rib 23 is preferably 0.8 mm and more preferably 1.0 mm. Meanwhile, the upper limit of the average length of the connecting rib 23 is preferably 3.0 mm and more preferably 2.0 mm. When the average length of the connecting rib 23 is less than the lower limit, the vibration absorption ability of the connecting rib 23 may be insufficient. To the contrary, when the average length of the connecting rib 23 is more than the upper limit, the strength of the connecting rib 23 may be insufficient.

Intermediate Rib

The intermediate rib 24 is provided annularly, such that connected points between the outer straight ribs 21 and the oblique ribs 22 are mutually connected. As a result, deformation of the outer straight ribs 21 is suppressed and consequently the strength of the support foot 2 is improved. In addition, the intermediate rib 24 equalizes deformation of each outer straight rib 21 and each oblique rib 22, in other words, distributes the vibration over all the outer straight ribs 21 and the oblique ribs 22, thereby improving the strength and the vibration absorption ability of the support foot 2.

The lower limit of an average thickness of the intermediate rib 24 is preferably 2 mm and more preferably 2.5 mm. Meanwhile, the upper limit of the average thickness of the intermediate rib 24 is preferably 3.5 mm and more preferably 3.0 mm. When the average thickness of the intermediate rib 24 is less than the lower limit, the strength and the vibration absorption ability of the support foot 2 may not be sufficiently improved. To the contrary, when the average thickness of the intermediate rib 24 is more than the upper limit, propagation of the vibration between the outer straight rib 21 and the oblique rib 22 may be inhibited, and consequently the vibration absorption ability of the support foot 2 may be impaired.

Cushion Sheet

The cushion sheet 9 is formed from a sheet-like member having shock-absorbing properties, and prevents the vibration of the mounting surface of the electronic device from being propagated to the support foot 2.

Examples of the material for the cushion sheet 9 include felt, foamed rubber, and the like. Of these, felt is preferably used.

An average thickness of the cushion sheet 9 depends on a material, and may be 1 mm or more and 3 mm or less.

The cushion sheet 9 may be provided with a covering layer on a bottom face, in order to improve strength and to prevent e.g., intrusion of foreign substances. As the covering layer, for example, a coating layer of an ethylene-ethyl acrylate copolymer or the like may be used. An average thickness of the cushion sheet 9 may be, for example, 0.2 mm or more and 0.5 mm or less.

As a process for pasting the cushion sheet 9 onto a back face of the bottom wall portion 11, a procedure including using an adhesive, a double-stick tape or the like may be employed, for example. In particular, the procedure including using a double-stick tape is convenient.

Advantages

As described above, due to including the oblique ribs 22 connected to the outer straight ribs 21 respectively, the support foot 2 according to the one embodiment of the present invention is capable of efficiently converting the vibration energy into the thermal energy, and therefore has superior anti-vibration properties. As a result, in the electronic device having the support feet 2, the vibration of the electronic device main body 1 can be suppressed.

Second Embodiment

Figure 6:
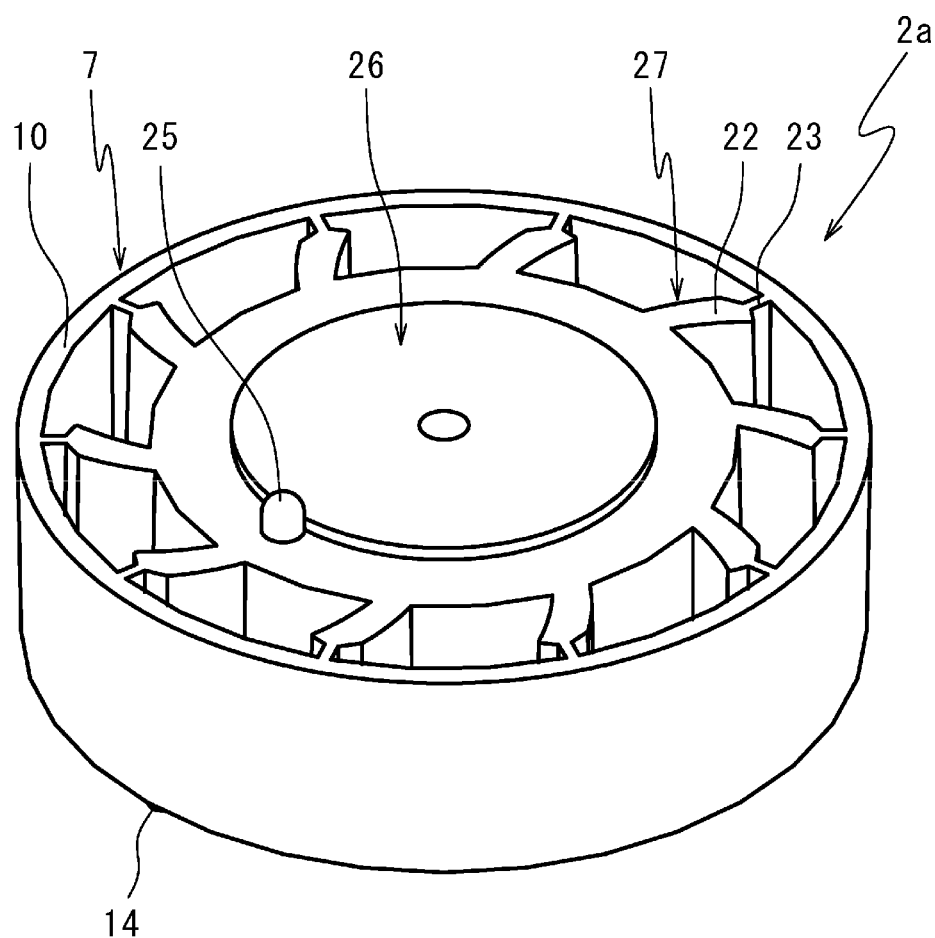
FIG. 6 is a schematic perspective view from a top side of a support foot according to an embodiment of the present invention different from that of FIG. 2.
Figure 7:
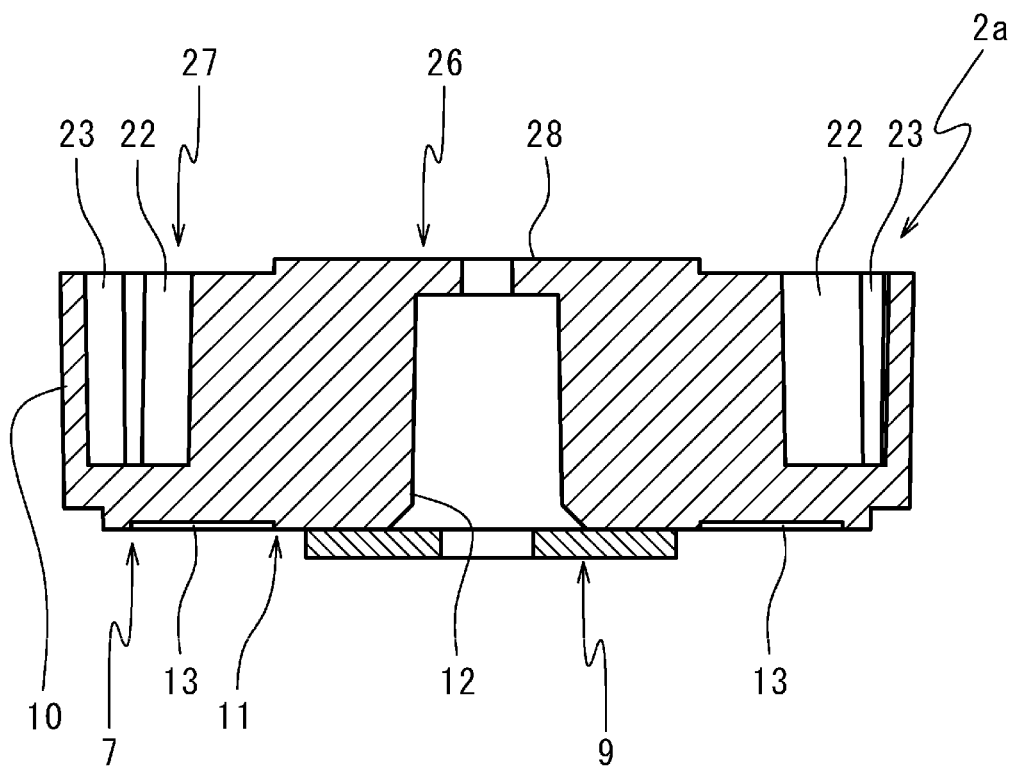
FIG. 7 is a schematic cross sectional view of the support foot shown in FIG. 6.

FIGS. 6 and 7 show a support foot 2a according to a second embodiment of the present invention. Instead of the support foot 2 of FIG. 2, the support foot 2a of FIG. 6 may be used for the electronic device of FIG. 1.

The support foot 2a of the present embodiment includes: a bottomed cylindrical outer shell 7; an attachment portion 26 provided in a central part in the outer shell 7 and to be fixed to the electronic device main body 1; and a rib structure 27 provided in the outer shell 7, on an outer periphery of the attachment portion 26. The support foot 2a further includes a cushion sheet 9 pasted onto the bottom face of the outer shell 7.

Figure 2:
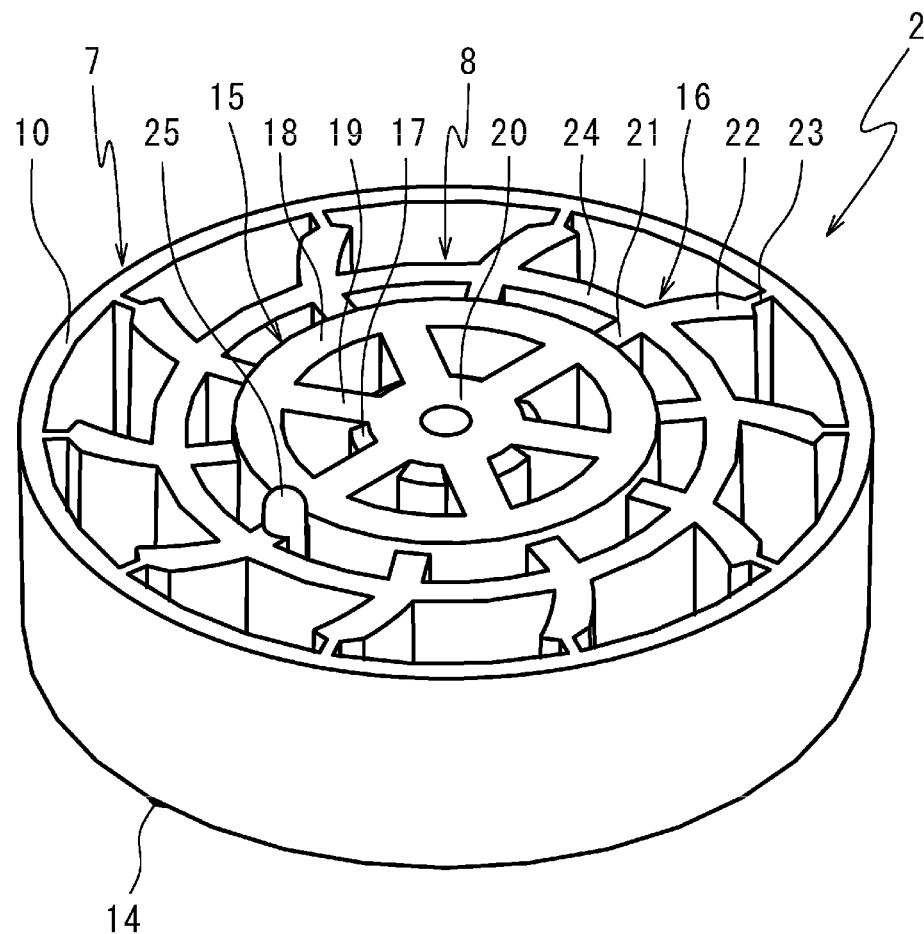
FIG. 2 is a schematic perspective view from a top side of a support foot of the electronic device shown in FIG. 1.
Figure 3:
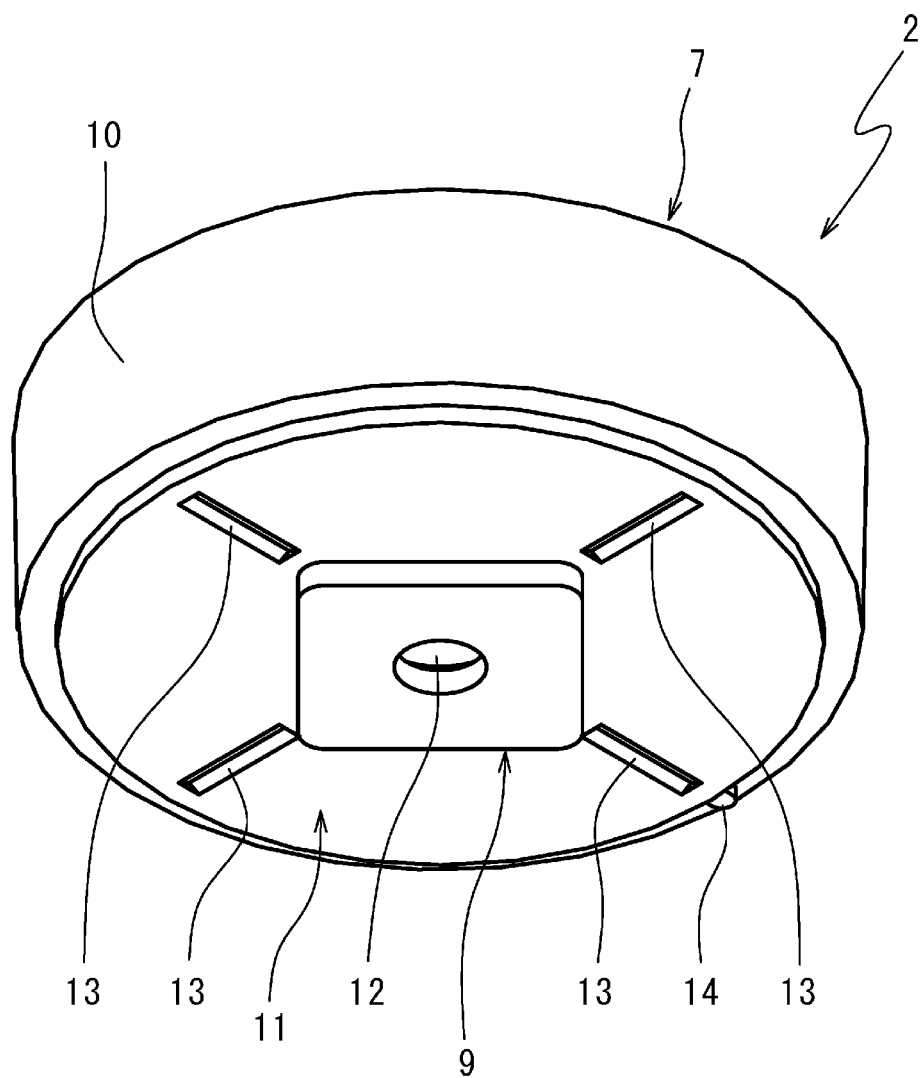
FIG. 3 is a schematic perspective view from a bottom side of the support foot shown in FIG. 2.
Figure 4:
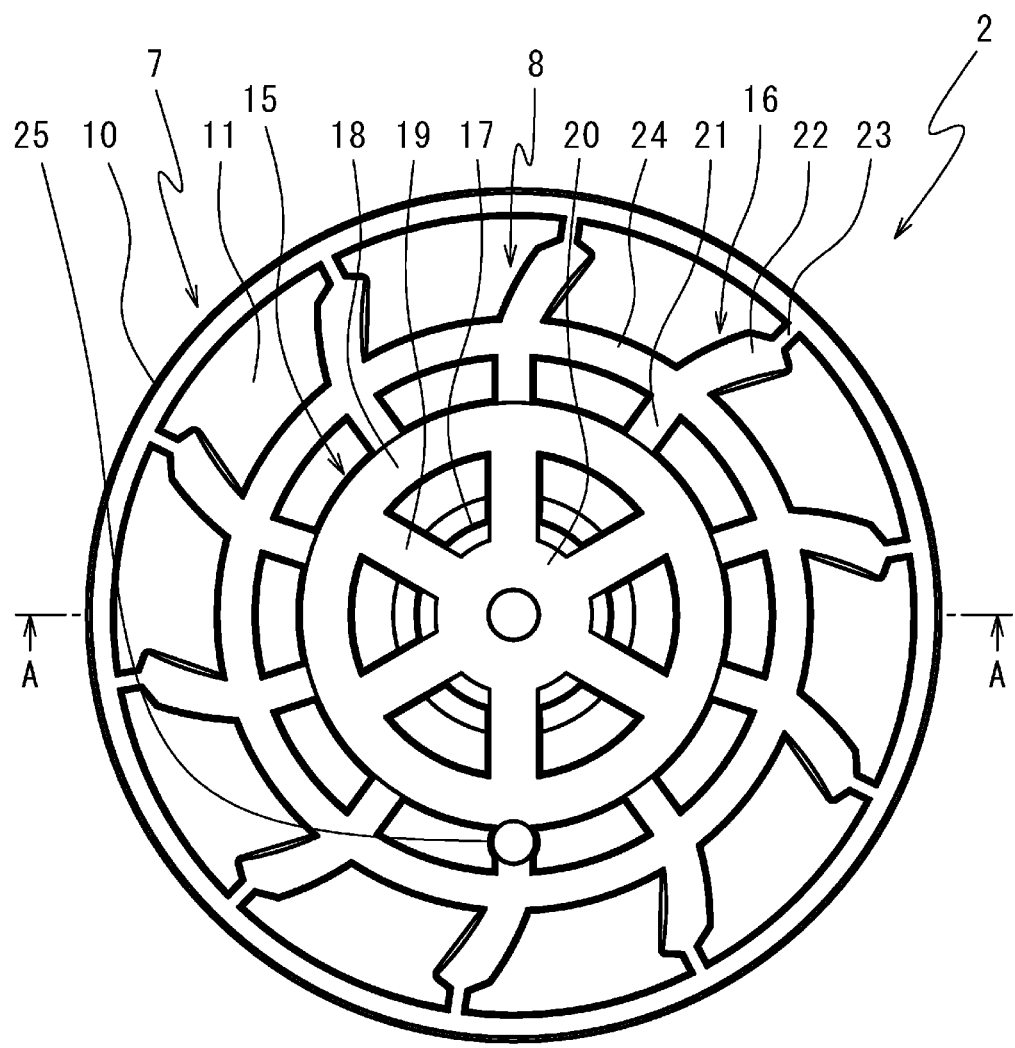
FIG. 4 is a schematic plan view of the support foot shown in FIG. 2.
Figure 5:
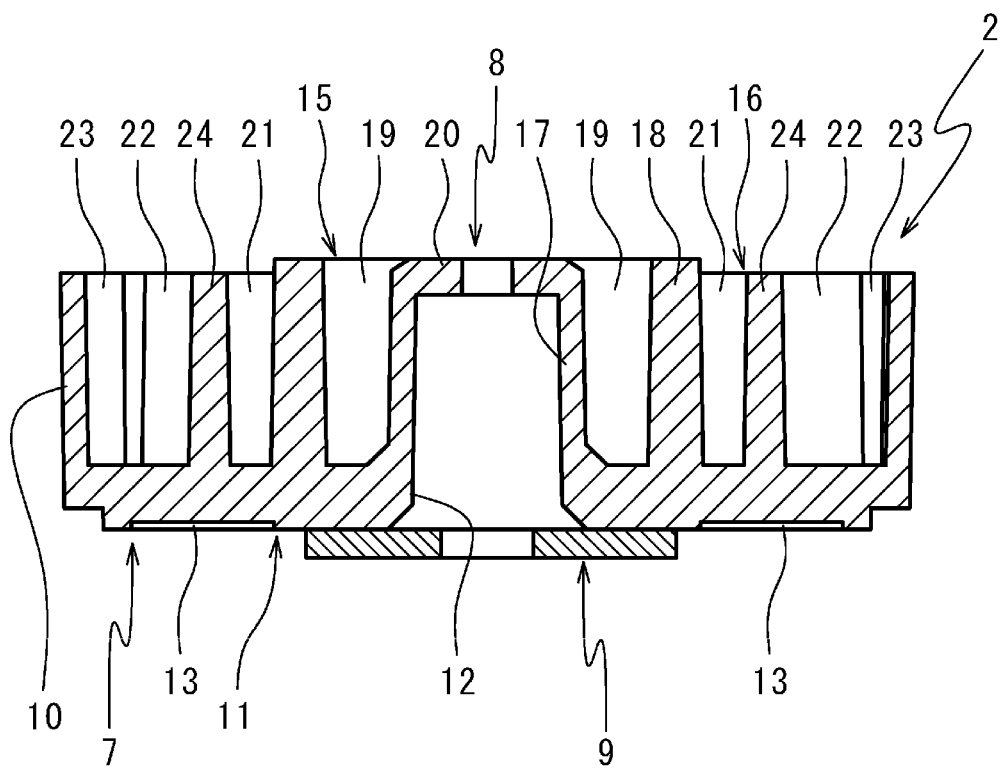
FIG. 5 is a schematic cross sectional view of the support foot shown in FIG. 4, taken along the A-A line.

The outer shell 7 and the cushion sheet 9 in the support foot 2a of FIG. 6 may be similar to the outer shell 7 and the cushion sheet 9 in the support foot 2 of FIG. 2. Hereinafter, with regard to the support foot 2a of FIG. 6, constitutive elements that are the same as those of the support foot 2 of FIG. 2 are referred to with the same reference numerals and repeating explanation thereof is omitted.

Attachment Portion

The attachment portion 26 of the support foot 2a of FIG. 6 is formed to have a thick-walled circular cylindrical shape or a donut shape. In the attachment portion 26, an inner cavity is continued from the securing hole 12 on the bottom wall portion 11, and on an upper end of the inner cavity, a bearing plate 28 that serves as a bearing surface for the screw for securing the support foot 2a to the electronic device main body 1 is provided. The attachment portion 26 is a rigid body that principally supports the weight of the electronic device main body 1, and may be formed from a resin, integrally with the outer shell 7 and the rib structure 27.

Rib Structure

The rib structure 27 is provided inside the outer shell 7, in parallel with the axial direction. In other words, the rib structure 27 is constituted from a plurality of ribs which protrude from the bottom wall portion 11 in the axial direction of the support foot 2. The plurality of ribs in the rib structure 27 are each formed in a strip-like plate shape that extends along the bottom wall portion 11, with one side edge (lower edge) being connected to the bottom wall portion 11.

More specifically, the rib structure 27 of the support foot 2a of FIG. 6 includes: a plurality of oblique ribs 22 that are arranged at regular intervals on an outer periphery of the attachment portion 26 to be oblique with respect to the radial direction in relation to the central axis (direction of radii) of the outer shell 7 and to extend outwards; and a plurality of connecting ribs 23 that connect respective outer ends of the oblique ribs 22 to the outer peripheral wall portion 10 of the outer shell 7. The constitution of the oblique ribs 22 and the connecting ribs 23 of the rib structure 27 in the support foot 2a of FIG. 6 may be similar to that of the oblique ribs 22 and the connecting ribs 23 of the rib structure 8 in the support foot 2 of FIG. 2.

In the support foot 2a, the plurality of oblique ribs 22 are deformed to be bent, and thus convert the vibration energy into heat to efficiently attenuate vibration. Accordingly, the support foot 2a is able to attenuate the vibration of the electronic device main body 1 and to suppress vibration propagated from a mounting surface of the installation site to the electronic device main body 1.

Third Embodiment

Figure 8:
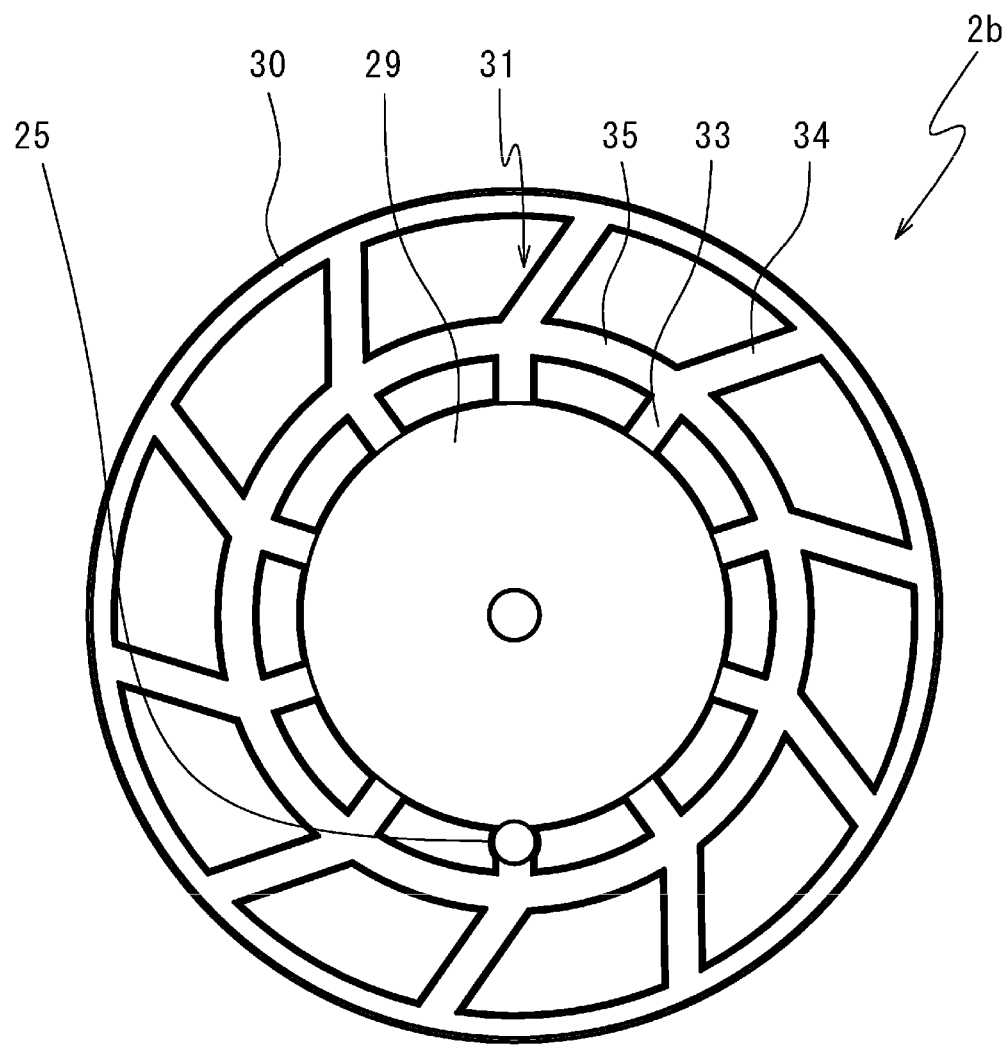
FIG. 8 is a schematic plan view of a support foot according to an embodiment of the present invention different from those of FIGS. 2 and 6.
Figure 9:
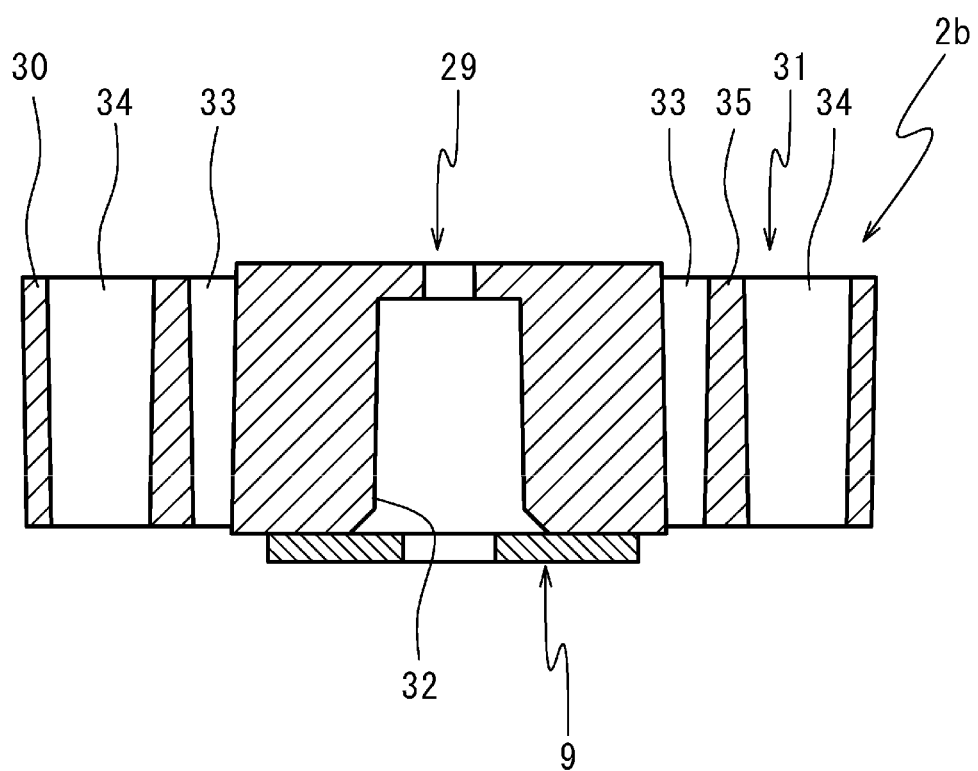
FIG. 9 is a schematic cross sectional view of the support foot shown in FIG. 7.

FIGS. 8 and 9 show a support foot 2b according to a third embodiment of the present invention. Instead of the support foot 2 of FIG. 2, the support foot 2b of FIG. 8 may be used for the electronic device of FIG. 1.

The support foot 2b of the present embodiment includes: an attachment portion 29 to be fixed to the electronic device main body 1; an outer peripheral wall portion 30 cylindrically shaped and provided on an outer periphery of the attachment portion 29; and a rib structure 31 provided between the attachment portion 29 and the outer peripheral wall portion 30. The support foot 2a further includes a cushion sheet 9 pasted onto the bottom face of the attachment portion 29.

The cushion sheet 9 in the support foot 2b of FIG. 8 may be similar to the cushion sheet 9 in the support foot 2 of FIG. 2. Hereinafter, with regard to the support foot 2b of FIG. 8, constitutive elements that are the same as those of the support foot 2 of FIG. 2 are referred to with the same reference numerals and repeating explanation thereof is omitted.

Attachment Portion

The attachment portion 29 in the support foot 2b of FIG. 8 is formed to have a thick-walled circular cylindrical shape or a disk shape, and has a securing hole 32 that is open on a bottom face. The attachment portion 29 is a rigid body that principally supports the weight of the electronic device main body 1, and may be formed from a resin, integrally with the outer peripheral wall portion 30 and the rib structure 31.

Outer Peripheral Wall Portion

The outer peripheral wall portion 30 ensures a good appearance, and connects the outer peripheral part of the rib structure 31 to restrict free vibration, and in turn suppress vibration.

The thickness of the outer peripheral wall portion 30 of the support foot 2b of FIG. 8 may be the same as the outer peripheral wall portion 10 of the support foot 2 of FIG. 2.

Rib Structure

The rib structure 31 includes: straight ribs 33 provided at regular intervals on an outer periphery of the attachment portion 29 to extend outwards in a radial direction in relation to the central axis of the outer peripheral wall portion 30; and a plurality of oblique ribs 34 provided on an outer side of the respective straight ribs 33 to be oblique with respect to the radial direction and to extend outwards. The rib structure 31 further includes an annular intermediate rib 35 provided between the straight ribs 33 and the oblique ribs 34.

The constitution of the straight ribs 33 and the intermediate rib 35 in the support foot 2b of FIG. 8 may be similar to that of the outer straight ribs 21 and the intermediate rib 24 in the support foot 2 of FIG. 2.

Oblique Rib

In the support foot 2b according to the present embodiment, the oblique ribs 34 are each formed to be straight in a planar view, and oblique with respect to the radial direction at a certain angle.

The constitution of the oblique ribs 34 in the support foot 2b of FIG. 8 may be similar to that of the oblique ribs 22 in the support foot 2 of FIG. 2, except that the oblique ribs 34 are each formed to be straight in a planar view.

Also in the support foot 2b including the oblique ribs 34 that are not curved in a planar view as described above, relative movement (vibration) of the attachment portion 29 with respect to the outer peripheral wall portion 30 is enabled in such a way that the oblique rib 34 curves, due to the oblique rib 34 being oblique with respect to the radial direction. Therefore, the support foot 2b is also capable of suppressing the vibration by converting the vibration energy into heat through deformation of the oblique rib 34.

Fourth Embodiment

Figure 10:
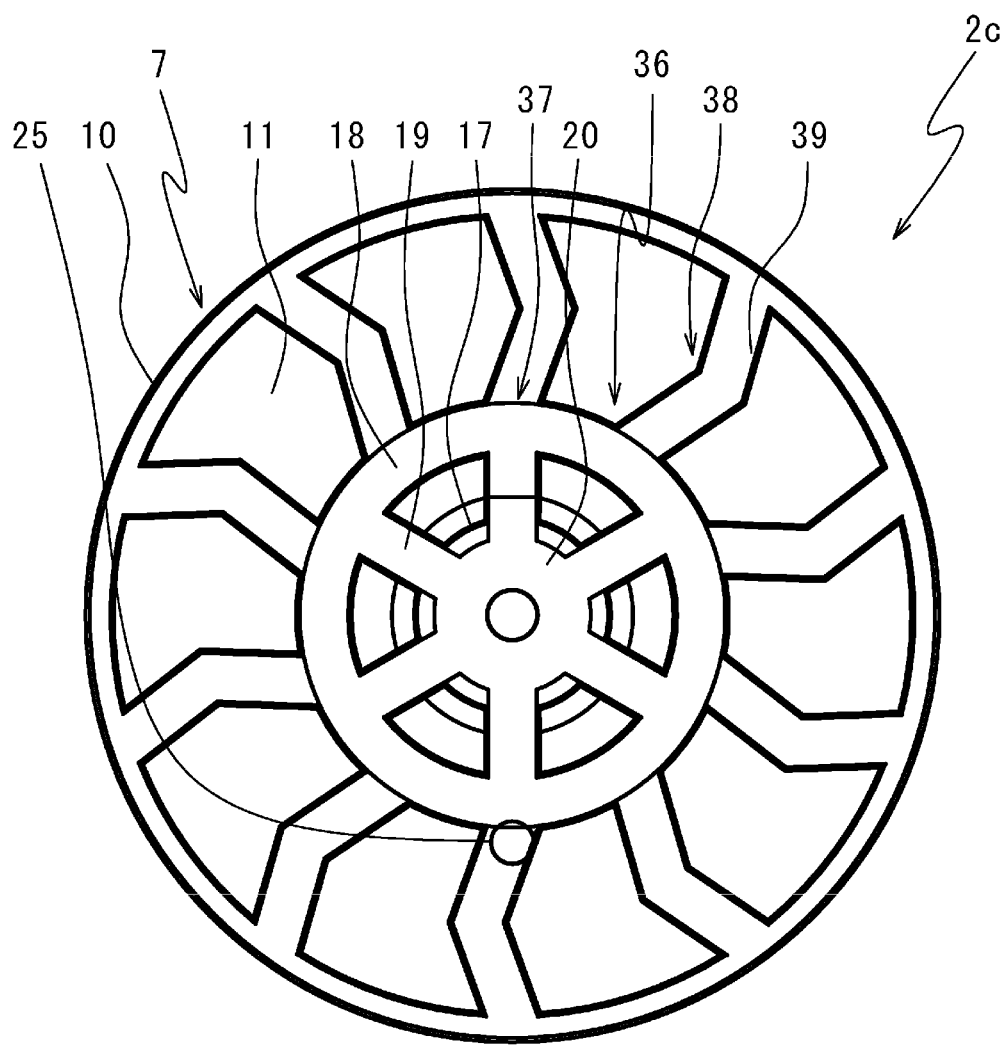
FIG. 10 is a schematic plan view of a support foot according to an embodiment of the present invention different from those of FIGS. 2, 6, and 8.

FIG. 10 shows a support foot 2c according to a fourth embodiment of the present invention. Instead of the support foot 2 of FIG. 2, the support foot 2c of FIG. 10 may be used for the electronic device of FIG. 1.

The support foot 2c according to the present embodiment includes a bottomed circular cylindrical outer shell 7, and a rib structure 36 provided in the outer shell 7. The outer shell 7 and the rib structure 36 are integrally formed from a resin.

The outer shell 7 in the support foot 2c of FIG. 10 may be similar to the outer shell 7 in the support foot 2 of FIG. 2. Hereinafter, with regard to the support foot 2c of FIG. 10, constitutive elements that are identical to those of the support foot 2 of FIG. 2 are referred to with the same reference numerals and repeating explanation thereof is omitted.

The rib structure 36 is provided inside the outer shell 7, in parallel with the axial direction. In other words, the rib structure 36 is constituted from a plurality of ribs which protrude from the bottom wall portion 11 of the outer shell 7 in the axial direction of the support foot 2c. The plurality of ribs in the rib structure 36 are each formed in a strip-like plate shape that extends along the bottom wall portion 11, with one side edge (lower edge) being connected to the bottom wall portion 11.

In the rib structure 36, a central part has a slightly greater height in a planar view, thereby protruding upwards to abut the bottom face of the electronic device main body 1. Therefore, the central part serves as an attachment portion 37 that principally supports the weight of the electronic device main body 1. Meanwhile, a part on the outer side of the attachment portion 37 in the rib structure 36 serves as a vibration suppression portion 38 that does not abut the bottom face of the electronic device main body 1 and principally absorbs vibration. In other words, the rib structure 8 includes a first rib structure that constitutes the attachment portion 37 and a second rib structure that constitutes the vibration suppression portion 38 provided between the attachment portion 37 and the outer peripheral wall portion 10.

The constitution of the attachment portion 37 in the rib structure 36 in the support foot 2c of FIG. 10 may be similar to that of the attachment portion 15 in the rib structure 8 in the support foot 2 of FIG. 2.

A vibration suppression portion 38 in the rib structure 36 in the present embodiment is constituted only of a plurality of oblique ribs 39 that connect the attachment portion 37 to the outer peripheral wall portion 10 of the outer shell 7.

Oblique Rib

The oblique rib 39 is bent at a central part thereof, with a section on the attachment portion 37 side and a section on the outer peripheral wall portion 10 side being oblique in different directions with respect to the radial direction in relation to the central axis of the outer peripheral wall portion 10. As a result, although the sections are each oblique with respect to the radial direction in relation to the central axis of the outer peripheral wall portion 10, the oblique rib 39 as a whole extends substantially in the radial direction. It is to be noted that the oblique rib 39 in the present embodiment can be considered to be constituted of a straight oblique rib and another oblique rib which is oblique in a different direction and is connected to an outer side of the straight oblique rib.

With regard to each of the sections that extend from the central part of the oblique rib 39 and are oblique in different directions with respect to the radial direction, the lower limit of an inclination angle with respect to the radial direction is preferably 15° and more preferably 20°. Meanwhile, the upper limit of the inclination angle of each section of the oblique rib 39 with respect to the radial direction is preferably 45° and more preferably 40°. When the inclination angle of each section of the oblique rib 39 with respect to the radial direction is less than the lower limit, the oblique rib 39 may be less likely to deform, and therefore sufficient absorption of the vibration may fail. To the contrary, when the inclination angle of each section of the oblique rib 39 with respect to the radial direction is more than the upper limit, the oblique rib 39 has greater elastic deformability, and consequently sufficient absorption of the vibration may fail, due to a decreased efficiency of conversion from the vibration energy into heat.

An average thickness of the oblique rib 39 depends on a material, but the lower limit thereof is preferably 2 mm and more preferably 2.5 mm. Meanwhile, the upper limit of the average thickness of the oblique rib 39 is preferably 3.5 mm and more preferably 3.0 mm. When the average thickness of the oblique rib 39 is less than the lower limit, deformability of the oblique rib 39 may be excessive, and consequently absorbable vibration energy may be lower. To the contrary, when the average thickness of the oblique rib 39 is more than the upper limit, the oblique rib 39 may be too rigid and thus sufficient absorption of the vibration may fail.

The lower limit of an average length of each section of the oblique rib 39 is preferably 3 mm and more preferably 5 mm. Meanwhile, the upper limit of the average length of each section of the oblique rib 39 is preferably 10 mm and more preferably 8 mm. When the average length of each section of the oblique rib 39 is less than the lower limit, the oblique rib 39 may not have sufficient deformability, and therefore sufficient attenuation of the vibration may fail. To the contrary, when the average length of each section of the oblique rib 39 is more than the upper limit, the size of the support foot 2c may be unnecessarily large.

Other Embodiments

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

The number of the support feet provided in the electronic device is not particularly limited as long as stable support for the electronic device main body is enabled, and may be an arbitrary number of 3 or more.

In the support foot, the oblique ribs may be provided on an inner side while the straight ribs may be provided on an outer side, in a planar view.

In the support foot, the bottom wall portion, the straight rib, the intermediate rib and the connecting rib are optional members and may therefore be omitted or added.

In the support foot, deformation of the oblique ribs may be promoted by forming the oblique ribs to be bent in such a range that they are oblique in the same direction with respect to the radial direction.

The attachment portion in the support foot is not limited to such a structure involving the rib structure. The attachment portion may include a solid portion between the central rib and the boundary rib, or may be formed into a thick-walled and enclosed cylindrical shape.

The support foot according to the present invention can be used for various types of electronic devices. Of these, the support foot may be particularly suitably used for, for example, audio devices such as a disk player, an audio amplifier, and a video recorder.

EXPLANATION OF THE REFERENCE SYMBOLS

1 Electronic device main body
2, 2a, 2b, 2c Support foot
3 Housing
4 Push button switch
5 Rotating knob
6 Display unit
7 Outer shell
8, 27, 31, 36 Rib structure
9 Cushion sheet
10, 30 Outer peripheral wall portion
11 Bottom wall portion
12, 32 Securing hole
13 Positioning groove
14 Indicator projection
15, 26, 29, 37 Attachment portion
16, 38 Vibration suppression portion
17 Central rib
18 Boundary rib
19 Inner straight rib
20, 28 Bearing plate
21 Outer straight rib
22, 34, 39 Oblique rib
23 Connecting rib
24, 35 Intermediate rib
25 Positioning projection
33 Straight rib

The invention claimed is:
1. A support foot for an electronic device comprising:
an attachment portion to be fixed to an electronic device main body;
an outer peripheral wall portion cylindrically shaped and provided on an outer periphery of the attachment portion; and a rib structure provided between the attachment portion and the outer peripheral wall portion, wherein the rib structure comprises an oblique rib that is, in a planar view, oblique with respect to a radial direction in relation to a central axis of the outer peripheral wall portion, and a straight rib that extends in the radial direction in relation to the central axis of the outer peripheral wall portion, and wherein the oblique rib extends in a direction different from the direction that the straight rib extends.

2. The support foot according to claim 1, wherein at least a part of the oblique rib is curved.

3. The support foot according to claim 1, wherein:

the straight rib is provided in a circular region around the central axis of the outer peripheral wall portion; and the oblique rib is provided in an annular region on an outer periphery of the circular region.

4. The support foot according to claim 3, wherein the rib structure comprises a connecting rib that is provided such that the straight rib or the oblique rib is connected to the outer peripheral wall portion, and is smaller in thickness than the straight rib and the oblique rib.

5. The support foot according to claim 1, wherein the rib structure comprises a connecting rib that is provided such that the straight rib or the oblique rib is connected to the outer peripheral wall portion, and is smaller in thickness than the straight rib and the oblique rib.

6. The support foot according to claim 1, wherein the rib structure further comprises an intermediate rib annularly shaped and provided between the straight rib and the oblique rib.

7. An electronic device comprising:

an electronic device main body; and a support foot attached to a bottom face of the electronic device main body, wherein the support foot comprises: an attachment portion to be fixed to an electronic device main body; an outer peripheral wall portion cylindrically shaped and provided on an outer periphery of the attachment portion; and a rib structure provided between the attachment portion and the outer peripheral wall portion, the rib structure comprising an oblique rib that is, in a planar view, oblique with respect to a radial direction in relation to a central axis of the outer peripheral wall portion, and a straight rib that extends in the radial direction in relation to the central axis of the outer peripheral wall portion, and wherein the oblique rib extends in a direction different from the direction that the straight rib extends.

8. The electronic device according to claim 7, wherein at least a part of the oblique rib is curved.

9. The electronic device according to claim 7, wherein:

the straight rib is provided in a circular region around the central axis of the outer peripheral wall portion; and the oblique rib is provided in an annular region on an outer periphery of the circular region.

10. The electronic device according to claim 7, wherein the rib structure comprises a connecting rib that is provided such that the straight rib or the oblique rib is connected to the outer peripheral wall portion, and is smaller in thickness than the straight rib and the oblique rib.

11. The electronic device according to claim 7, wherein the rib structure further comprises an intermediate rib annularly shaped and provided between the straight rib and the oblique rib.

\* \* \* \* \*